United States Patent
Gekht et al.

(10) Patent No.: US 8,851,870 B2
(45) Date of Patent: Oct. 7, 2014

(54) GAS SEAL ARRANGEMENT FOR ROTARY INTERNAL COMBUSTION ENGINE

(75) Inventors: Eugene Gekht, Brossard (CA); Jean Thomassin, Ste-Julie (CA); David Gagnon-Martin, Longueuil (CA)

(73) Assignee: Pratt & Whitney Canada Corp, Longueuil, Quebec ( * ) Notice: Subject to any disclaimer, the term of this patent is extended or adjusted under 35 U.S.C. 154(b) by 288 days.

(21) Appl. No.: 13/273,870

(22) Filed: Oct. 14, 2011

(65) Prior Publication Data

US 2013/0028777 A1  Jan. 31, 2013

Related U.S. Application Data

(60) Provisional application No. 61/512,483, filed on Jul. 28, 2011.

(51) Int. Cl.
| | |
|---|---|
| *F01C 19/00* | (2006.01) |
| *F01C 19/02* | (2006.01) |
| *F01C 1/22* | (2006.01) |
| *F01C 19/08* | (2006.01) |
| *F01C 21/08* | (2006.01) |

(52) U.S. Cl.
CPC ............... *F01C 19/005* (2013.01); *F01C 19/02* (2013.01); *F01C 1/22* (2013.01); *F01C 19/08* (2013.01); *F01C 21/08* (2013.01); *F04C 2240/80* (2013.01); *F01C 19/085* (2013.01)
USPC .......... 418/116; 123/200; 418/117; 418/119; 418/120; 418/121; 418/141; 418/61.2

(58) Field of Classification Search
CPC ...... F01C 19/005; F01C 19/085; F01C 19/02; F01C 1/22; F01C 19/08; F01C 21/08; F04C 2240/80
USPC .......... 123/200; 418/113, 116, 117, 119, 120, 418/121, 123, 124, 142, 141, 61.2; 29/888.012
See application file for complete search history.

(56) References Cited

U.S. PATENT DOCUMENTS 3,033,180 A * 5/1962 Bentele .................... 418/123
3,064,880 A * 11/1962 Wankel et al. ............ 418/124
(Continued)

FOREIGN PATENT DOCUMENTS

| EP | 2497902 | 9/2012 | |
|---|---|---|---|
| JP | 03233105 A * | 10/1991 | ............... F01C 19/10 |

OTHER PUBLICATIONS

JP 03233105 A Translation, Jun. 2014.*

*Primary Examiner* — Kenneth Bomberg
*Assistant Examiner* — Jason T Newton
(74) *Attorney, Agent, or Firm* — Norton Rose Fulbright Canada

(57) ABSTRACT

A rotor of a rotary internal combustion engine, with each of the end faces having at each of the apex portions a recess defined therein in communication with the at least one apex groove, an end seal received in the recess in sealing engagement with the apex seal of each of the at least one apex groove, a first seal member in sealing engagement with the end seal and with the face seal of the face groove defined between the apex portion and a first one of the adjacent apex portions, and a second seal member in sealing engagement with the end seal and with the face seal of the face groove defined between the apex portion and a second one of the adjacent apex portions.

20 Claims, 4 Drawing Sheets

(56) References Cited

U.S. PATENT DOCUMENTS

| | | | | |
|---|---|---|---|---|
| 3,112,868 A | * | 12/1963 | Hagen | 418/119 |
| 3,180,562 A | * | 4/1965 | Bentele | 418/61.2 |
| 3,193,188 A | * | 7/1965 | Bentele | 418/121 |
| 3,269,369 A | * | 8/1966 | Ehrhardt | 418/123 |
| 3,711,229 A | * | 1/1973 | Kurio | 418/121 |
| 3,768,936 A | * | 10/1973 | McCormick | 418/142 |
| 3,797,973 A | | 3/1974 | Prasse et al. | |
| 3,802,811 A | * | 4/1974 | Ruf et al. | 418/113 |
| 3,830,600 A | * | 8/1974 | Shimoji et al. | 418/113 |
| 3,847,518 A | * | 11/1974 | Prasse et al. | 418/122 |
| 3,860,365 A | * | 1/1975 | Bibbens | 418/61.2 |
| 3,885,799 A | * | 5/1975 | Bibbens | 277/357 |
| 3,930,767 A | * | 1/1976 | Hart | 418/113 |
| 3,933,293 A | * | 1/1976 | McLain | 228/117 |
| 3,955,904 A | * | 5/1976 | Catterson | 418/121 |
| 3,972,660 A | * | 8/1976 | Mangus | 418/121 |
| 3,995,599 A | * | 12/1976 | Shier | 123/203 |
| 4,008,989 A | * | 2/1977 | Clarke et al. | 418/120 |
| 4,029,444 A | * | 6/1977 | Clarke | 418/120 |
| 4,225,294 A | * | 9/1980 | Kakuwa et al. | 418/142 |
| 4,808,096 A | * | 2/1989 | Eiermann et al. | 418/113 |
| 2007/0189914 A1 | * | 8/2007 | Atkins | 418/250 |
| 2012/0227397 A1 | | 9/2012 | Willi et al. | |

* cited by examiner

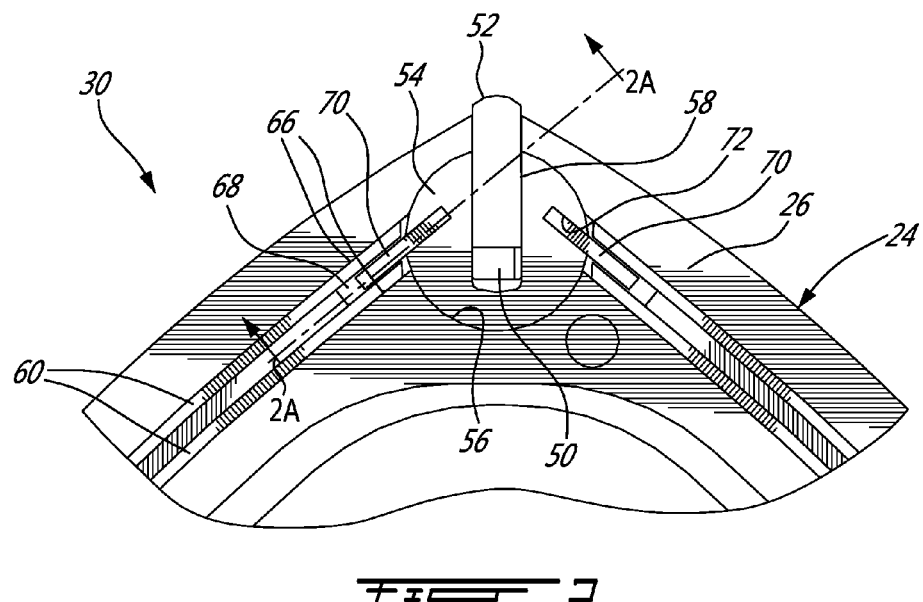
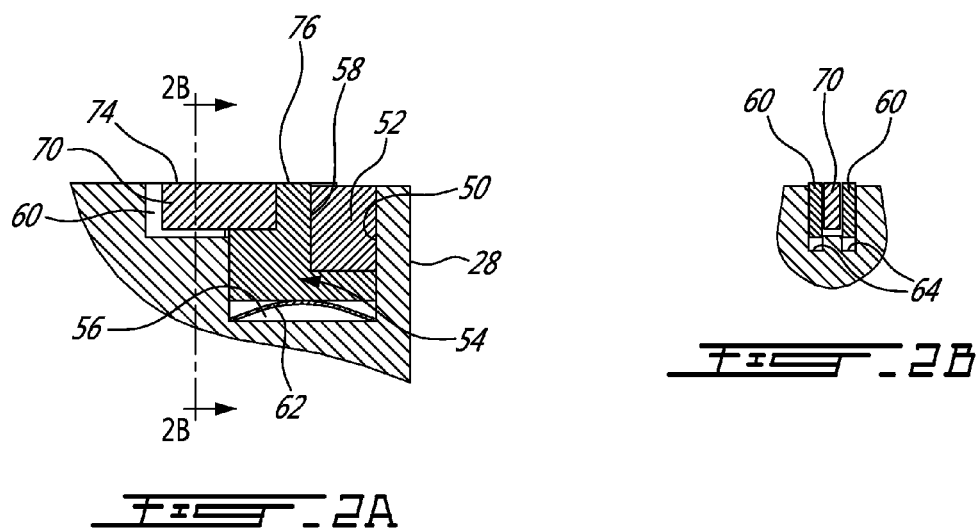

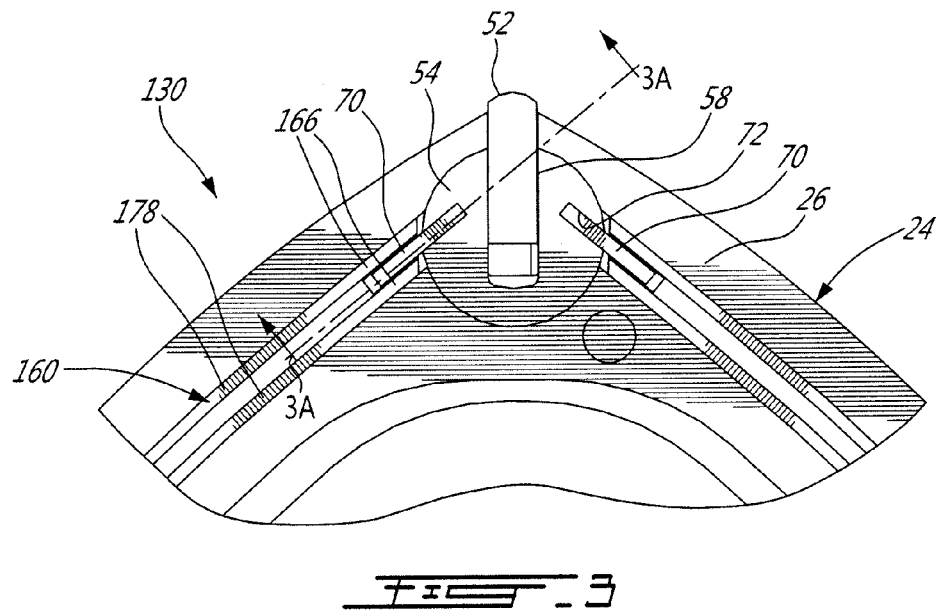
FIG. 3
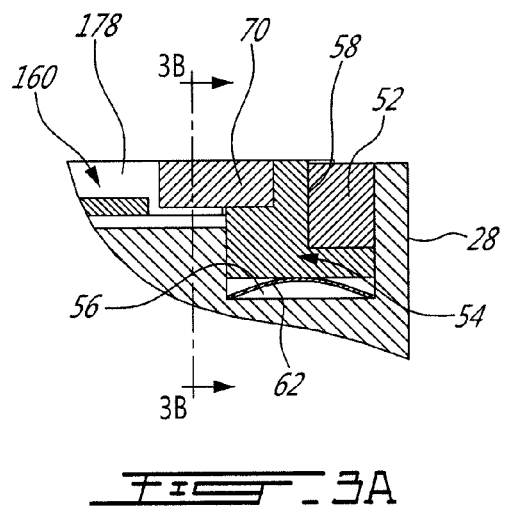
FIG. 3A
FIG. 3B

GAS SEAL ARRANGEMENT FOR ROTARY INTERNAL COMBUSTION ENGINE

CROSS-REFERENCE TO RELATED APPLICATION

This application claims priority on provisional U.S. application No. 61/512,483 filed Jul. 28, 2011, the entire contents of which are incorporated by reference herein.

TECHNICAL FIELD

The application relates generally to an internal combustion engine using a rotary design to convert pressure into a rotating motion, more particularly, to a gas seal arrangement for such an engine.

BACKGROUND OF THE ART

Rotary engines such as the ones known as Wankel engines use the eccentric rotation of a piston to convert pressure into a rotating motion, instead of using reciprocating pistons. In these engines, the rotor includes a number of apex portions which remain in contact with a peripheral wall of the rotor cavity of the engine throughout the rotational motion of the rotor.

The space around the rotor within the rotor cavity defines a number of working chambers which must be sealed from one another in order for the engine to work efficiently. The working chambers must also be sealed from the oil exposed central portion of the rotor cavity. Prior art sealing arrangements typically have gaps between some of the adjacent seal members, which may be due to manufacturing tolerances and/or differential thermal expansions of the seal elements and rotor.

In particular, it is known to provide apex seals along the apex portions and face seals along end faces of the rotor which are interconnected through intermediate or end seals. However, the manufacturing tolerances of the face seal may result in undesirable gaps at their junction with the end seals.

SUMMARY

In one aspect, there is provided a rotor of a rotary internal combustion engine, the rotor comprising a body having two axially spaced apart end faces, and a peripheral face extending between the end faces and defining three circumferentially spaced apex portions, each of the apex portions having at least one apex groove defined radially inwardly into the rotor body and extending between the end faces, each of the at least one apex groove having an apex seal received therein biased radially away from the peripheral face, each of the end faces having a face groove defined therein between each of the apex portions and each adjacent one of the apex portions, each face groove extending axially inwardly into the rotor body and having a face seal received therein biased axially away from the end face, and each of the end faces having at each of the apex portions a recess defined therein in communication with the at least one apex groove, an end seal received in the recess in sealing engagement with the apex seal of each of the at least one apex groove, a first seal member in sealing engagement with the end seal and with the face seal of the face groove defined between the apex portion and a first one of the adjacent apex portions, and a second seal member in sealing engagement with the end seal and with the face seal of the face groove defined between the apex portion and a second one of the adjacent apex portions.

In another aspect, there is provided a rotary internal combustion engine comprising a stator body having an internal cavity defined by two axially spaced apart end walls and a peripheral wall extending between the end walls, the cavity having an epitrochoid shape defining two lobes, a rotor body having two axially spaced apart end faces each extending in proximity of a respective one of the end walls of the stator body, and a peripheral face extending between the end faces and defining three circumferentially spaced apex portions, the rotor body being engaged to an eccentric shaft to rotate within the cavity with each of the apex portions remaining adjacent the peripheral wall, each of the apex portion having at least one apex seal extending between the end faces and protruding radially from the peripheral face, each apex seal being radially biased against the peripheral surface, each of the end faces having a face seal extending between each of the apex portions and each adjacent one of the apex portions, each face seal protruding axially from the end face and being axially biased against the respective one of the end walls, and each of the end faces having at each of the apex portions an end seal in sealing engagement with the at least one apex seal, a first seal member in sealing engagement with the end seal and with the face seal extending between the apex portion and a first one of the adjacent apex portions, and a second seal member in sealing engagement with the end seal and with the face seal extending between the apex portion and a second one of the adjacent apex portions.

In a further aspect, there is provided a method of sealing a junction between an end seal of an apex portion of a rotor of a Wankel engine and at least one face seal extending from an adjacent apex portion of the rotor, the method comprising connecting a feather seal to one of the end seal and the at least one face seal, and sealingly engaging the feather seal with the other of the end seal and the at least one face seal.

DESCRIPTION OF THE DRAWINGS

Reference is now made to the accompanying figures in which:

FIG. 2 is a schematic enlarged view of an apex portion of a rotor of the engine of FIG. 1;

FIG. 2A is a schematic cross-sectional view taken along line 2A-2A of FIG. 2;

FIG. 2B is a schematic cross-sectional view taken along line 2B-2B of FIG. 2A;

FIG. 3 is a schematic enlarged view of an apex portion of a rotor in accordance with an alternate embodiment;

FIG. 3A is a schematic cross-sectional view taken along line 3A-3A of FIG. 3;

FIG. 3B is a schematic cross-sectional view taken along line 3B-3B of FIG. 3A;

DETAILED DESCRIPTION

Figure 1:
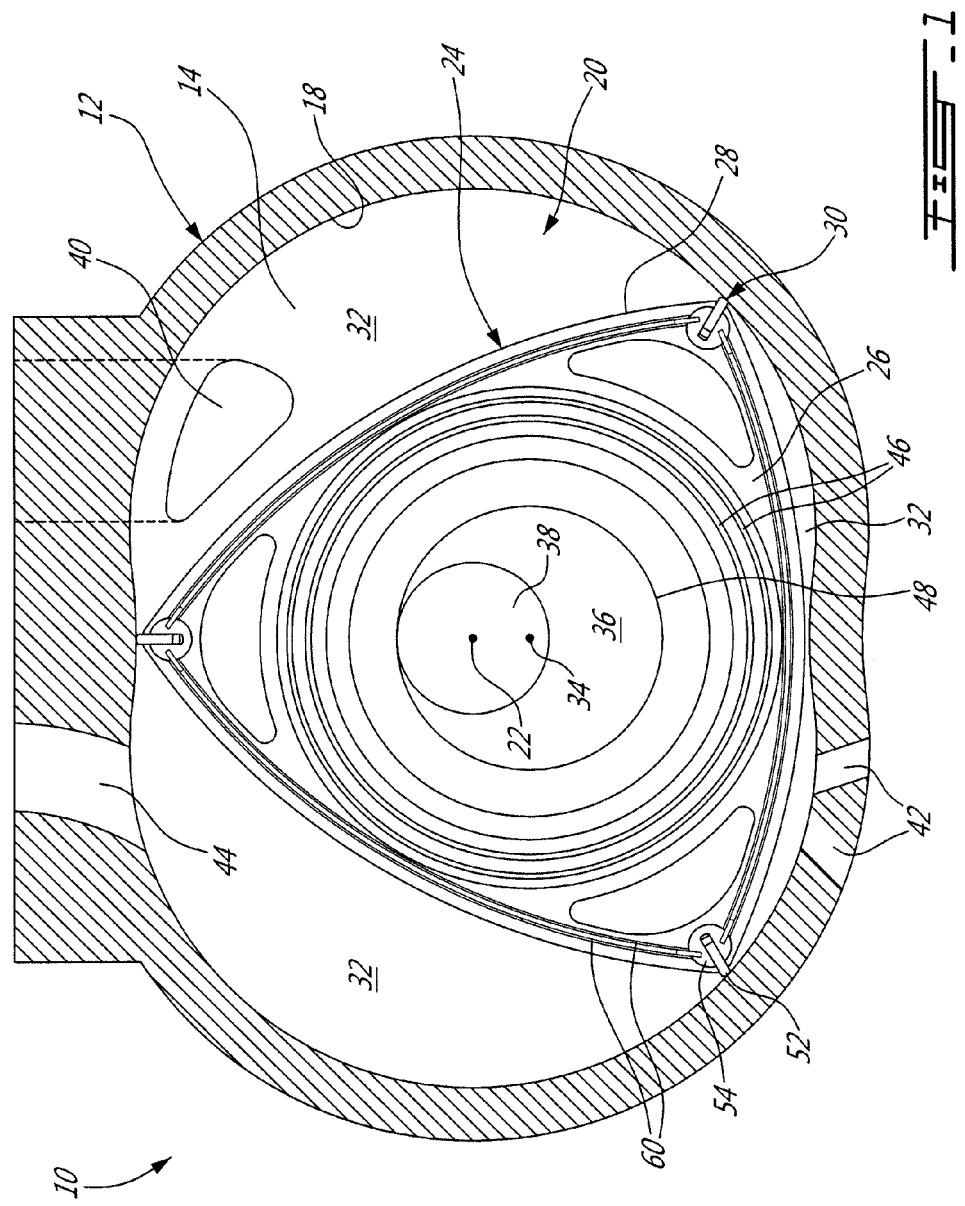
FIG. 1 is a schematic cross-sectional view of a rotary internal combustion engine in accordance with one embodiment.

Referring to FIG. 1, a rotary internal combustion engine 10 known as a Wankel engine is schematically shown. The engine 10 comprises an outer body 12 having axially-spaced end walls 14 with a peripheral wall 18 extending therebetween to form a rotor cavity 20. The inner surface of the peripheral wall 18 of the cavity 20 has a profile defining two lobes, which is preferably an epitrochoid.

An inner body or rotor 24 is received within the cavity 20. The rotor 24 has axially spaced end faces 26 adjacent to the outer body end walls 14, and a peripheral face 28 extending therebetween. The peripheral face 28 defines three circumferentially-spaced apex portions 30, and a generally triangular profile with outwardly arched sides. As will be detailed further below, the apex portions 30 are in sealing engagement with the inner surface of peripheral wall 18 to form three working chambers 32 between the inner rotor 24 and outer body 12. The geometrical axis 34 of the rotor 24 is offset from and parallel to the axis 22 of the outer body 12.

In the embodiment shown, the outer body 12 is stationary while the rotor 24 is journaled on an eccentric portion 36 of a shaft 38, the shaft 38 being co-axial with the geometrical axis 22 of the cavity 20. Upon rotation of the rotor 24 relative to the outer body 12 the working chambers 32 vary in volume. An intake port 40 is provided through one of the end walls 14 for admitting air, or air and fuel, into one of the working chambers 32. Passages 42 for a spark plug or other ignition mechanism, as well as for one or more fuel injectors (not shown) are provided through the peripheral wall 18. An exhaust port 44 is also provided through the peripheral wall 18 for discharge of the exhaust gases from the working chambers 32. Alternately, the exhaust port 44 and/or the passages 42 may be provided through the end wall 14, and/or the intake port 40 may be provided through the peripheral wall 18.

During engine operation the working chambers 32 have a cycle of operation including the four phases of intake, compression, expansion and exhaust, these phases being similar to the strokes in a reciprocating-type internal combustion engine having a four-stroke cycle.

At least one oil seal ring 46 is disposed in a circular groove in each end face 26 of the rotor between the bearing 48 for the rotor 24 on the shaft eccentric 36 and the face seals. Each oil seal 46 prevents leakage flow of lubricating oil radially outwardly thereof between the respective rotor end face 26 and outer body end wall 14. Suitable springs (not shown) are provided for urging each oil seal 46 axially into contact with the adjacent end wall 14 of the outer body 12.

For efficient engine operation the working chambers 32 are sealed by apex seals, face seals and end seals.

Referring to FIGS. 2-2A, each rotor apex portion 30 has a groove 50 defined therein and extending radially inwardly into the rotor body 24, from one end face 26 to the other. An apex seal 52 is received within each groove 50, and protrudes radially from the peripheral face 28. In a particular embodiment, each apex seal 52 extends axially beyond both end faces 26, and has an axial dimension which is as close as possible to a distance between the two end walls 14 of the cavity 20, taking into consideration the difference in thermal expansion between the material(s) of the outer body 12 and the material of the apex seal 52, which in a particular embodiment is made of a suitable type of ceramic. In a particular embodiment, each apex seal 52 is monolithic, i.e. is formed of a single seal member. Alternately, each apex seal 52 may be formed of two or more cooperating seal members. More than one apex seal 52 may also be provided on each apex portion 30. Each apex seal 52 is biased radially outwardly against the peripheral wall 18 through a respective spring (not shown).

An end seal 54 is received within a respective cylindrical recess 56 defined at each end of the groove 50. Each end seal 54 has a radial slot 58 defined therein, which receives the respective end of the apex seal 52. Each end seal 54 is biased against the respective end wall 14 through a suitable spring 62 (FIG. 2A).

Referring to FIGS. 1-2, each end face 26 of the rotor 24 has two radially spaced apart grooves 64 (FIG. 2B) defined therein running between each pair of adjacent apex portions 30, with a face seal 60 being received within each groove 64. In a particular embodiment, each face seal 60 is monolithic. Each end face groove 64 and corresponding face seal 60 are arc-shaped and disposed adjacent to but inwardly of the rotor periphery throughout their length. A spring (not shown) located behind each face seal 60 urges it axially outwardly so that the face seal 60 projects axially away from the adjacent rotor end face 26 into sealing engagement with the adjacent end wall 14 of the cavity 20.

As can be seen more clearly in FIG. 2, each face seal 60 extends with each end 66 in close proximity to or in abutment with the adjacent end seal 54. As such, two face seals 60 extend between each pair of adjacent end seals 54 received on the same end face 26. The adjacent end face grooves 64 extending between the same apex portions 30 merge together near each recess 56, forming an opposed enlarged groove 68 in communication with the adjacent recess 56 at each end of the grooves 64. Each end 66 of each face seal 60 extends into the respective enlarged groove 68 near the corresponding end seal 54.

As shown in FIGS. 2-2A-2B, the junction between the end seal 54 and each pair of adjacent face seals 60 which extend from the same apex portion 30 is sealed by a thin seal member which in the embodiment shown in a feather seal 70. The feather seal 70 is partly received in a corresponding groove 72 defined in the end seal 54 and extends into the enlarged groove 68, between the two ends 66 of the adjacent face seals 60. Each feather seal 70 sealingly engages the end seal 54 and the adjacent face seals 60. Two feather seals 70 thus extend from each of the end seals 54, one in direction of each of the adjacent apex portions 30.

In the embodiment shown, the feather seals 70 are each attached or connected to the end seal 54 and extend freely between the corresponding face seals 60. In a particular embodiment, the feather seals 70 are permanently connected to the end seal 54, for example through welding or brazing. Alternately, the feather seals 70 may be attached or connected, for example permanently connected, to one of the face seals 60 and be slidably received within the respective groove 72 of the end seal 54. The feather seals 70 are machined such as to have an axially outer surface 74 aligned with that of the seal they are attached or connected to (here outer surface 76 of the end seal 54, see FIG. 2A).

In a particular embodiment, the feather seals 70, face seals 60 and end seals 54 are made of a same metal, for example cast iron.

Referring to FIGS. 3-3A-3B, an alternate embodiment is shown, where each end face 26 of the rotor 24 has a single groove 164 and face seal 160 extending between each pair of adjacent apex portions 30. Each face seal 160 has a U-shaped cross section defining two radially spaced knife edges 178 protruding axially from the end face 26. The feather seals 70 each extend from the corresponding groove 72 of the end seal 54 and between the ends 166 of the two knife edges 178 of the respective face seal 160. The feather seals 70 may be attached or connected, for example permanently connected through brazing or welding, to the end seal 54 or to one of the knife edges 178 of the respective face seal 160.

Figure 4:
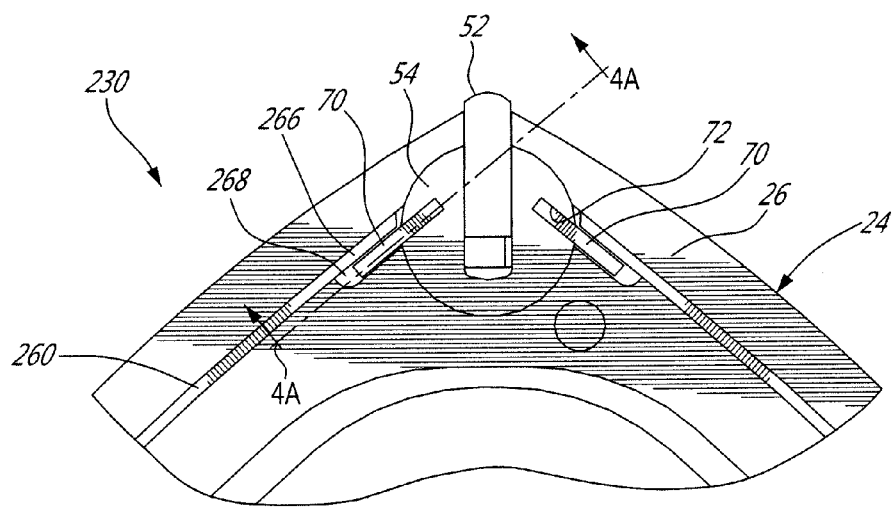
FIG. 4 is a schematic enlarged view of an apex portion of a rotor in accordance with another alternate embodiment.
Figure 4A:
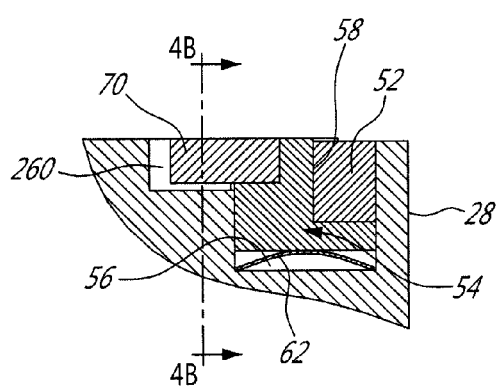
FIG. 4A is a schematic cross-sectional view taken along line 4A-4A of FIG. 4.
Figure 4B:
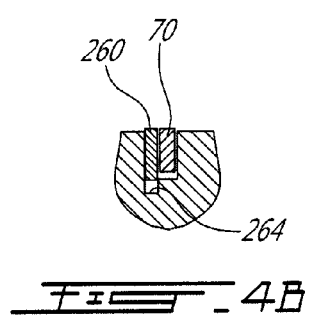
FIG. 4B is a schematic cross-sectional view taken along line 4B-4B of FIG. 4A.

Referring to FIGS. 4-4A-4B, an alternate embodiment is shown, where each end face 26 of the rotor 24 has a single groove 264 and face seal 260 extending between each pair of adjacent apex portions 30. Each face seal 260 is in the form of a single fin. The feather seals 70 each extend from the corresponding groove 72 of the end seal 54, into an enlarged portion 268 of the end face groove 264 receiving the end 266 of the face seal 260, and beyond the end 266 of the respective seal 260, i.e. in radial overlap therewith. In this embodiment, the feather seals 70 are permanently connected to the end seal 54, although connection with the respective face seal 260 is alternately possible.

The end seals 54, face seals 60, 160, 260 and feather seals 70 thus cooperate to form a seal against the respective end wall 14 around the perimeter of the rotor 24. Improved sealing along the end wall 14 reduces leakage of the hot gas into the oil system, which may improve performance of the engine, reduce the oil temperature, and/or reduce the oil contamination by the combustion by-products.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A rotor of a rotary internal combustion engine, the rotor comprising:
    a body having two axially spaced apart end faces, and a peripheral face extending between the end faces and defining three circumferentially spaced apex portions, each of the apex portions having at least one apex groove defined radially inwardly into the rotor body and extending between the end faces, each of the at least one apex groove having an apex seal received therein biased radially away from the peripheral face;
    each of the end faces having at least one face groove defined therein between each of the apex portions and each adjacent one of the apex portions, each face groove extending axially inwardly into the rotor body, and a plurality of face seals each received in one of the face grooves and biased axially away from the end face; and
    each of the end faces having at each of the apex portions:
        a recess defined therein in communication with the at least one apex groove,
        an end seal received in the recess in sealing engagement with the apex seal of each of the at least one apex groove,
        a first seal member in sealing engagement with and extending from the end seal in a direction of a first one of the adjacent apex portions, the first seal member extending between two ends of at least one of the face seals, and
        a second seal member in sealing engagement with and extending from the end seal in a direction of a second one of the adjacent apex portions, the second seal member extending between two ends of at least another one of the face seals.

2. The rotor as defined in claim 1, wherein the first and second seal members are feather seals.

3. The rotor as defined in claim 1, wherein each of the first and second seal members is attached to the end seal and free of the face seals.

4. The rotor as defined in claim 1, wherein the first seal member is attached to the at least one of the face seals, and the second seal member is attached to the at least another one of the face seals.

5. The rotor as defined in claim 1, wherein the at least one face groove defined between each of the apex portions and each adjacent one of the apex portions includes two radially spaced apart face grooves so that the at least one of the face seals includes two radially spaced apart first face seals and the at least another one of the face seals includes two radially spaced apart second face seals, the first seal member extending between the ends of the two first face seals, and the second seal member extending between the ends of the two second face seals.

6. The rotor as defined in claim 5, wherein each of the first and second seal members is attached to the end seal and free of the face seals.

7. The rotor as defined in claim 1, wherein the at least one face groove defined between each of the apex portions and each adjacent one of the apex portions includes a single face groove so that the at least one of the face seals includes one first face seal and the at least another one of the face seals includes one second face seal, each face seal having a U-shaped cross section defining two knife edges protruding axially from the end face and defining the two ends, the first seal extending between the knife edges of the first face seal, and the second seal member extending between the knife edges of the second face seal.

8. The rotor as defined in claim 1, wherein each end seal has a first groove defined therein receiving an end of the first seal member and a second groove defined therein receiving an end of the second seal member.

9. A rotary internal combustion engine comprising:
    a stator body having an internal cavity defined by two axially spaced apart end walls and a peripheral wall extending between the end walls, the cavity having an epitrochoid shape defining two lobes;
    a rotor body having two axially spaced apart end faces each extending in proximity of a respective one of the end walls of the stator body, and a peripheral face extending between the end faces and defining three circumferentially spaced apex portions, the rotor body being engaged to an eccentric shaft to rotate within the cavity with each of the apex portions remaining adjacent the peripheral wall;
    each of the apex portion having at least one apex seal extending between the end faces and protruding radially from the peripheral face, each apex seal being radially biased against the peripheral surface;
    each of the end faces having a plurality of face seals with at least one of the face seals extending between each of the apex portions and each adjacent one of the apex portions, each face seal protruding axially from the end face and being axially biased against the respective one of the end walls; and
    each of the end faces having at each of the apex portions:
        an end seal in sealing engagement with the at least one apex seal,
        a first seal member in sealing engagement with and extending from the end seal in a direction of a first one of the adjacent apex portions, the first seal member extending between two ends of at least one of the face seals, and
        a second seal member in sealing engagement with and extending from the end seal in a direction of a second one of the adjacent apex portions, the second seal member extending between two ends of at least a another one of the face seals.

10. The engine as defined in claim 9, wherein the first and second seal members are feather seals.

11. The engine as defined in claim 9, wherein each of the first and second seal members is attached to the end seal and free of the at least one face seal.

12. The engine as defined in claim 9, wherein the first seal member is attached to the at least one face seals, and the second seal member is attached to the at least another one of the face seals.

13. The engine as defined in claim 9, wherein the face seals include two radially spaced apart face seals extending between each of the apex portions and each adjacent one of the apex portions so that the at least one of the face seals includes two first face seals and the at least another one of the face seals includes two second face seals, the first seal member extending between the ends of the two first face seals, and the second seal member extending between the ends of the two second face seals.

14. The engine as defined in claim 13, wherein each of the first and second seal members is attached to the end seal and free of the first and second face seals.

15. The engine as defined in claim 9, wherein the face seals include a single face seal extending between each of the apex portions and each adjacent one of the apex portions so that the at least one of the face seals includes one first face seal and the at least another one of the face seals includes one second face seal, each face seal having a U-shaped cross section defining two knife edges protruding axially from the end face and defining the two ends, the first seal extending between the knife edges of the first face seal, and the second seal member extending between the knife edges of the second face seal.

16. The engine as defined in claim 9, wherein each end seal has a first groove defined therein receiving an end of the first seal member and a second groove defined therein receiving an end of the second seal member.

17. A method of sealing a junction between an end seal of an apex portion of a rotor of a Wankel engine and at least one face seal extending from an adjacent apex portion of the rotor, the method comprising:
  sealingly engaging one end of a feather seal with the end seal;
  inserting another end of the feather seal between two ends defined by the at least one face seal; and
  connecting the feather seal to one of the end seal and the at least one face seal.

18. The method as defined in claim 17, wherein connecting the feather seal includes welding or brazing the feather seal.

19. The method as defined in claim 17, wherein the junction is defined between an end seal and two face seals extending from the adjacent apex portion, connecting the feather seal includes connecting the one end of the feather seal to the end seal, and the other end of the feather seal is inserted between the two face seals.

20. The method as defined in claim 17, wherein the junction is defined between an end seal and a single faces seal extending from the adjacent apex portion, connecting the feather seal includes connecting the one end of the feather seal to the end seal, and the other end of the feather seal is inserted between two axially extending knife edges of the face seal.

* * * * *